/ United States Patent / Bak et al.

(10) Patent No.: US 10,908,958 B2
(45) Date of Patent: *Feb. 2, 2021

(54) SHARED MEMORY IN MEMORY ISOLATED PARTITIONS

(71) Applicant: Microsoft Technology Licensing, LLC, Redmond, WA (US)

(72) Inventors: Yevgeniy M. Bak, Redmond, WA (US); Mehmet Iyigun, Kirkland, WA (US); Landy Wang, Honolulu, HI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,106

(22) Filed: Mar. 21, 2019

(65) Prior Publication Data

US 2019/0220317 A1 Jul. 18, 2019

Related U.S. Application Data

(63) Continuation of application No. 15/409,267, filed on Jan. 18, 2017, now Pat. No. 10,275,169.

(51) Int. Cl.
*G06F 3/06* (2006.01)
*G06F 9/50* (2006.01)

(52) U.S. Cl.
CPC .......... *G06F 9/5016* (2013.01); *G06F 3/0604* (2013.01); *G06F 3/0623* (2013.01); *G06F 3/0644* (2013.01); *G06F 3/0683* (2013.01)

(58) Field of Classification Search
CPC .... G06F 3/0623; G06F 9/5016; G06F 3/0644; G06F 3/0604; G06F 3/0683

USPC ......................................................... 711/147
See application file for complete search history.

(56) References Cited

U.S. PATENT DOCUMENTS

| 10,228,859 | B2 * | 3/2019 | Deshpande | G06F 12/122 |
| 2007/0005908 | A1 * | 1/2007 | Lakshmanamurthy | G06F 12/0835 711/146 |
| 2009/0307438 | A1 * | 12/2009 | Logan | G06F 11/0724 711/153 |
| 2012/0137103 | A1 * | 5/2012 | Logan | G06F 11/0724 711/171 |

OTHER PUBLICATIONS

Pradeep K. Sinha, "Distributed Shared Memory," in Distributed Operating Systems: Concepts and Design , IEEE, 1997, pp. 231-281.*

* cited by examiner

*Primary Examiner* — Pierre Miche Bataille

(57) ABSTRACT

Multiple partitions can be run on a computing device, each partition running multiple processes referred to as a workload. Each of the multiple partitions, is isolated from one another, preventing the processes in each partition from interfering with the operation of the processes in the other partitions. Using the techniques discussed herein, some memory pages of a partition (referred to as a sharing partition) can be shared with one or more other partitions. The pages that are shared are file backed (e.g., image or data files) or pagefile backed memory pages. The sharing partition can be, for example, a separate partition that is dedicated to sharing memory pages.

20 Claims, 4 Drawing Sheets

SHARED MEMORY IN MEMORY ISOLATED PARTITIONS

RELATED APPLICATIONS

This application is a continuation patent application of copending application with Ser. No. 15/409,267, filed Jan. 18, 2017 entitled "Shared Memory in Memory Isolated Partitions", which is now allowed. The aforementioned application(s) are hereby incorporated herein by reference.

BACKGROUND

Operating systems can use hardware resource partitioning to share hardware resources among multiple different workloads in a computing device. While such sharing can increase the number of workloads running on a device, such sharing is not without its problems. One such problem is that management of hardware resources during such sharing can be difficult, which can degrade the performance of the workloads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first workload is run in a first partition of multiple partitions on a computing device, the first partition including a first memory space. A second workload is also run in a second partition of the multiple partitions on the computing device, the second partition including a second memory space. A shared memory is established on the computing device, the shared memory comprising a file backed or pagefile backed memory, and both the first workload and the second workload are allowed to access the shared memory.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Shared memory in memory isolated partitions is discussed herein. Multiple partitions can be run on a computing device, each partition running multiple processes. The processes that are run within a given partition can also be referred to as a workload. Each of the multiple partitions, also referred to as memory isolated partitions, is isolated from one another, preventing the processes in each partition from interfering with the operation of the processes in the other partitions. Each partition is assigned its own memory space, and processes in one partition are not able to access memory space of another partition, unless configured to share memory pages as discussed herein. The use of partitions provides a guarantee to processes running inside a partition that memory allocated to the partition will be available for use by processes running in the partition, and that processes running in other partitions will not be able to alter that guarantee.

Using the techniques discussed herein, some memory pages of a partition (referred to as a sharing partition) can be shared with one or more other partitions. The pages that are shared are file backed (e.g., image or data files) or pagefile backed memory pages. The sharing partition can be, for example, a separate partition that is dedicated to sharing memory pages. By sharing memory pages, the density of partitions on a computing device can be increased. For example, if each of five different partitions on a computing device desire to run the same program, that program can be loaded into the memory pages of the sharing partition. Each of those five different partitions can then use the shared memory pages into which that program was loaded, allowing the program to be loaded into memory pages of the computing device once rather than five different times. This reduces the amount of memory that each partition needs to use, and can thus increase the number of partitions that can be supported on a computing device.

Figure 1:
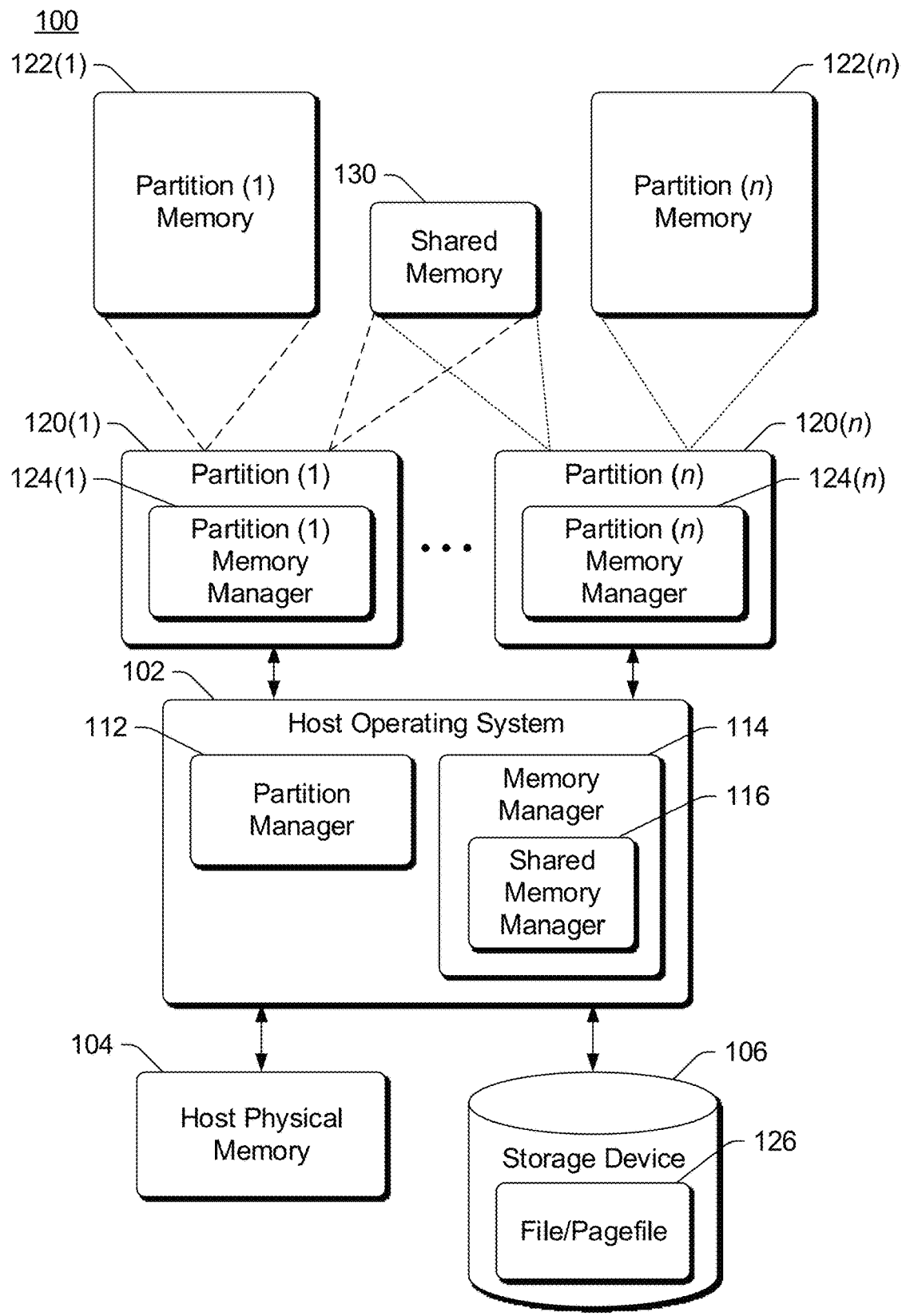
FIG. 1 illustrates an example system implementing the shared memory in memory isolated partitions in accordance with one or more embodiments. System 100 is implemented at least in part by a computing device.

FIG. 1 illustrates an example system 100 implementing the shared memory in memory isolated partitions in accordance with one or more embodiments. System 100 is implemented at least in part by a computing device. Any of a variety of different types of computing devices can be used to implement the system 100, such as a server computer, a desktop computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality glasses or headset, augmented reality headset or glasses), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device implementing system 100 may range from a full resource device with substantial memory and processor resources (e.g., server computers, personal computers, game consoles) to a low-resource device with limited memory and/or processing resources (e.g., traditional set-top boxes, hand-held game consoles).

The system 100 includes a host operating system 102, a host physical memory 104, and a storage device 106. In one or more embodiments, the host operating system 102, host physical memory 104, and storage device 106 are implemented as part of the same computing device. Alternatively, at least part of the host physical memory 104 and/or storage device 106 can be implemented on a separate device from the device implementing the host operating system 102. For example, the storage device 106 can be implemented as a removable or remote storage device. Such a removable or remote storage device can communicate with the computing device implementing the host operating system 102 using a wired or wireless connection, such as a USB (universal serial bus) connection, a wireless USB connection, an infrared connection, a Bluetooth connection, a DisplayPort connection, a PCI (a peripheral component interconnect) Express connection, and so forth. Such a removable or remote storage device can alternatively or additionally communicate with the computing device implementing the host operating system 102 via a data network, such as the Internet, a local area network (LAN), a public telephone network, an intranet, other public and/or proprietary networks, combinations thereof, and so forth. The removable or remote storage device may alternatively or additionally implement a file server, a distributed filesystem and so forth.

The host operating system 102 includes a partition manager 112 and a memory manager 114. The host operating system 102, via partition manager 112, manages multiple (n) partitions 120(1), . . . , 120(n). The memory manager 114 manages the host physical memory 104 and the storage device 106. The host physical memory 104 is, for example, random access memory (RAM). The storage device 106 can be any of a variety of different types of persistent (e.g., nonvolatile) storage devices, such as a magnetic disk drive, an optical disc drive, a solid-state drive (SSD), and so forth. The memory manager 114 manages the host physical memory 104 including paged memory and non-paged memory (e.g., non-paged pool, driver allocated memory, etc.), allocating portions of the memory 104 to programs running on the system 100. Each page is a particular (e.g., fixed) size unit of data. The memory manager 114 also includes a shared memory manager 116 that facilitates sharing of memory by the partitions 120, as discussed in more detail below.

One or more programs can be run within each partition 120. These programs can be application programs, operating system programs, and so forth. When a partition 120 is created in the system 100, the memory manager 114 allocates or assigns partition memory 122 to the partition 120. Each partition 120 has its own allocated or assigned partition memory 122. Each partition 120 also includes a partition memory manager 124 that manages the partition memory 122 assigned or allocated to that partition 120. The partition memory manager 124 can perform various actions to manage the partition memory 122 associated with or allocated to that partition 120 for programs running that partition 120. However, the partition memory manager 124 within one partition does not manage the partition memory 122 associated with or allocated to another partition 120.

The system 100 makes use of paging. Paging refers to the memory manager 114 organizing physical and virtual memory into pages, which are a particular (e.g., fixed) size unit of data. The act of paging refers to reading data in units of pages from a backing file (e.g., a file or pagefile 126 stored on a storage device 106) when the data is not in the host physical memory 104. The act of paging also refers to writing dirty (modified) data back in units of pages into the pagefile. The memory pages are thus also referred to as pagefile backed or file backed memory pages. Such virtual memory and paging techniques are well known to those skilled in the art.

Each partition 120 is assigned physical memory that is that partition's partition memory 122. Each partition 120 includes a partition memory manager 124 that manages the partition memory 122 of that partition as it desires, such as using the physical memory pages to satisfy virtual allocations by processes running inside the partition, using the pages to back file mappings, and so forth. The physical pages that are assigned to a partition 120 as the partition's partition memory 122 go through the same lifecycle as regular pages on a computing device without partitions (e.g., when the pages are not used, they are on the free/zeroed lists). The pages in the partition memory 122 of a partition 120 can be used to back file mappings, pagefile backed section mappings, or virtual allocations created by processes running inside the partition 120 (or, in the case of shared partitions, back these mappings done by processes in other partitions that are sharing the pages).

The shared memory manager 116 facilitates sharing of a shared memory 130 by multiple partitions 120. In one or more embodiments, a sharing partition is created by the partition manager 112 as one of the partitions 120, the sharing partition being dedicated to providing shared memory to other partitions. Additionally or alternatively, the shared memory can be a "system partition", which refers to memory allocated to the host operating system 102 rather than one of the partitions 120.

The shared memory manager 116 designates an owner of the shared memory 130. In situations in which the shared memory 130 is associated with or allocated to a sharing partition, the owner of the shared memory 130 is the sharing partition. In situations in which the shared memory 130 is memory allocated to the host operating system 102, the owner of the shared memory 130 is the system partition.

Figure 2:
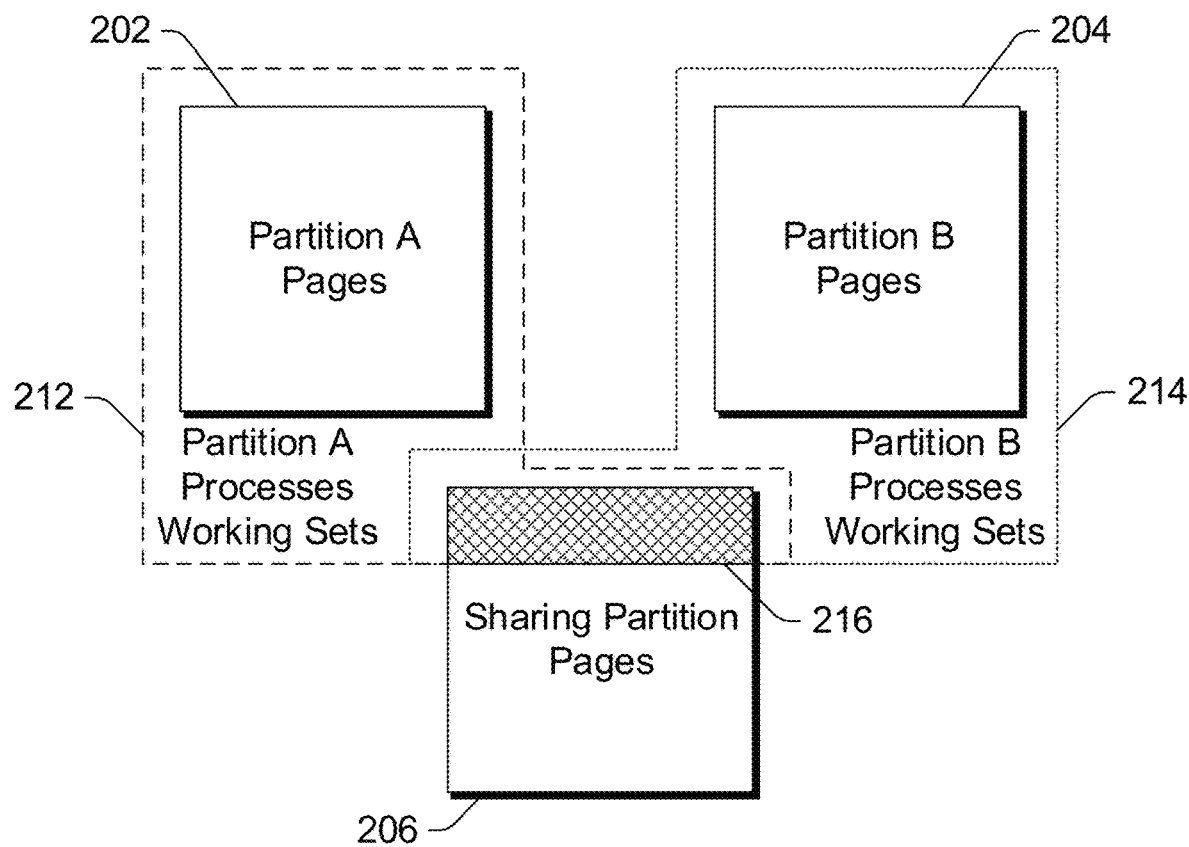
FIG. 2 illustrates an example of sharing memory in accordance with one or more embodiments.

FIG. 2 illustrates an example of sharing memory in accordance with one or more embodiments. As illustrated in FIG. 2, a set of memory pages 202 is allocated or assigned to one partition, shown as Partition A in the example of FIG. 2. Another set of memory pages 204 is allocated or assigned to another partition, shown as Partition B in the example of FIG. 2. Partition A and Partition B can each be any one of the multiple partitions 120 of FIG. 1. An additional set of memory pages 206 is allocated or assigned to a sharing partition, which can be one of the multiple partitions 120 of FIG. 1 or could be a system partition.

Partition A and Partition B each run one or more processes, and each process has a working set of memory pages that the process can access. Memory pages in the working set of a process running in a partition include memory pages that belong to the partition as well as any shared memory from a shared partition. Thus, the working sets 212 of processes in partition A include at least some of the set of memory pages 202 and the set of memory pages 206. Similarly, the working sets 214 of processes in partition B include at least some of the set of memory pages 204 and the set of memory pages 206. Processes in Partition A and Partition B can share the same memory pages from the set of memory pages 206, illustrated with crosshatching as memory pages 216.

By way of example, assume that a program running in Partition A desires to load a dynamic link library (DLL) that is already loaded in the sharing partition. Instead of loading the DLL into Partition A memory pages 202, Partition A starts using the pages of the sharing partition memory pages 206 that include the DLL. So, programs are running in Partition A and using the working sets 212 of processes in Partition A, including memory pages from the sharing partition memory pages 206 that include the DLL. Similarly, while Partition A is using the sharing partition memory pages 206 that include the DLL, assume a program running in Partition B desires to load the same DLL. Instead of loading the DLL into Partition B memory pages 204, Partition B starts using the pages of the sharing partition memory pages 206 that include the DLL. So, programs are running in Partition B and using the working sets 214 of processes in Partition B, including memory pages from the sharing partition memory pages 206 that include the DLL.

By sharing memory pages of a dedicated sharing partition or the system partition, situations in which one of the partitions (other than the sharing partition) is dependent on another partition can be avoided. For example, continuing with the previous example, if Partition A were instead to load the DLL into Partition A memory pages 202 and share those memory pages with Partition B, then Partition B would have some control over Partition A's memory usage (e.g., if Partition A no longer wanted the DLL loaded into its memory pages, Partition A would not be able to unload the DLL and repurpose its memory pages until partition B had released them from the process working set(s) of partition A). By using a dedicated sharing partition or system partition, situations in which memory usage in partitions (other than the sharing partition and/or the system partition) are dependent on other partitions are avoided.

Returning to FIG. 1, partitions 120 can be implemented in a variety of different manners. The partitions 120 provide memory isolation between workloads running inside the partitions 120. The partitions 120 also provide a guarantee that the amount of memory deposited into a partition 120 will always be available to the workload running inside that partition 120 without further dependencies to get physical memory from the rest of the system 100 or other partitions 120. The partitions 120 also provide a guarantee that partitions 120 running in the system 100 cannot take memory away (whether maliciously or unknowingly) from other partitions 120. The techniques discussed herein allow memory sharing between different partitions 120 without breaking these other isolation guarantees provided by the partitions 120. Such sharing facilitates coherency between workloads running in different partitions as well as reducing overall memory usage to increase workload density in the system 100.

In one or more embodiments, partitions 120 can be implemented as a process container. In a process container, programs run as if they were operating on their own individual system (e.g., computing device), which is accomplished using namespace isolation. Host operation system 102 implements namespace isolation. Namespace isolation provides processes in a container a composed view consisting of the shared parts of host operating system 102 and the isolated parts of the operating system that are specific to each container such as filesystem, configuration, network, and so forth. In one or more embodiments, such process containers do not include a virtual processor.

Additionally or alternatively, partitions 120 can be implemented as a virtualized container. A virtualized container is run in a lightweight virtual machine that, rather than having specific host physical memory 104 assigned to the virtual machine, has virtual address backed memory pages. Thus, the memory pages assigned to the virtual machine can be compressed and/or swapped out to a page file as discussed above. The use of a lightweight virtual machine provides additional security and isolation between processes running in a container. Thus, whereas process containers use process isolation or silo-based process isolation to achieve their containment, virtualized containers use virtual machine based protection to achieve a higher level of isolation beyond what a normal process boundary can provide.

The shared memory manager 116 facilitates sharing of the shared memory 130 by multiple partitions 120, including monitoring and keeping track of which shared memory pages are being used by which partitions. The sharing partition cannot exit (e.g., close or shut down) or unload shared memory pages (e.g., unload a file that was previously loaded into shared memory pages) until all partitions that are sharing the memory pages have exited or indicated they no longer desire to use the shared memory pages. This is because the other partitions that have those memory pages in their processes' working set are actively accessing the memory pages or may attempt to access the memory pages at any time. Thus, the sharing partition does not exit or unload the shared memory pages so that the contents of the shared memory pages are available to each of the partitions that are using the shared memory pages.

The shared memory manager 116 ensures that the sharing partition is not exited and/or the shared memory pages unloaded until all partitions that are sharing the memory pages have exited or indicated they no longer desire to use the shared memory pages by taking memory charges for the shared memory pages as if the shared memory pages were locked in memory (also referred to as "locked memory charges"). Taking memory charges as if the shared memory pages were locked refers to reserving or setting aside sufficient physical memory to prevent too much memory from being allocated to the sharing partition and the sharing partition ending up in an overcommitted memory state. Effectively, taking these memory charges ensures that there will be sufficient physical memory available to the sharing partition to store the shared memory pages. The shared memory manager 116 can implement these charges in various different manners. In one or more embodiments, the shared memory manager 116 keeps the shared memory pages in physical memory and does not allow them to be paged out to a file/pagefile 126. Additionally or alternatively, the shared memory manager 116 can allow the shared memory pages to be paged out to a file/pagefile 126, but with a guarantee that there will be physical memory available for the shared memory pages to be paged back in from the file/pagefile 126.

It should be noted that ensuring that there will be sufficient physical memory available to the sharing partition to store the shared memory pages refers to physical memory from the point of view of the sharing partition. The physical memory may be host physical memory 104, or may be virtualized physical memory (e.g., in situations in which the sharing partition is running as a virtual machine).

It should be noted that situations can also arise in which a particular partition 120 desires to share its memory with one or more other partitions 120. Such situations can arise, for example, where the owner or administrator of one partition 120 works with or otherwise trusts the owner or administrator of the one or more other partitions 120 with which the shared memory will be shared. Such a partition 120 that is sharing part of its memory cannot exit or unload those share memory pages until all other partitions that are accessing that shared memory also exit or cease accessing that shared memory, as discussed above. Accordingly, in one or more embodiments memory of a partition 120 is only shared in response to a request by that partition 120 to share its memory. It should be noted that a partition 120 is typically not forced to share its memory unless the partition 120 itself requests to do so.

Having a partition 120 share its memory pages with one or more other partitions rather than using a sharing partition that is available to all partitions 120 can support various usage scenarios. For example, the owner of a partition 120 may be comfortable sharing memory with another partition 120 that it also owns, but not with some other partition that is owned by another entity. By having a partition 120 owned by that owner 120 share the memory, the memory is not part of some dedicated sharing partition that is accessible to any partition in the system 100.

Restricting which other partitions can access memory shared by a particular partition 120 can be implemented in a variety of different manners. In one or more embodiments, the owner or administrator of a partition notifies the shared memory manager 116 of which other partitions 120 can share its memory, and the shared memory manager allows that memory to be shared only by those other partitions as specified by the owner or administrator of the partition. Additionally or alternatively, restricting which other partitions can access memory shared by a particular partition 120 can be implemented in other manners. For example, a file loaded into memory by a partition can have associated access controls (e.g., an access control list) indicating which partition(s) are allowed to access the file. The shared memory manager 116 enforces these access controls, allowing only other partitions as specified by these access controls to share the memory of the partition into which the file is loaded.

Additionally, having a partition 120 share its memory pages with one or more other partitions rather than using a sharing partition that is available to all partitions 120 can reduce the cost of accessing system 100 by the owner(s) of the partitions 120. For example, the same entity may own two different partitions 120 in the system 100, and pay a hoster or administrator of the system 100 for the ability to host the partitions 120 in the system 100. The hoster or administrator of the system 100 may also make a dedicated sharing partition available for use to the owner, at an additional charge. However, the owner of the two partitions 120 can, by sharing memory from one of the two partitions with another, get the benefits of sharing memory while avoiding the additional cost of using the dedicated sharing partition.

The shared memory 130 can be provided by a single sharing partition, or alternatively the system 100 can include multiple sharing partitions. The amount of memory space in any particular sharing partition can vary, and can be specified by the shared memory manager 116 and/or by a component that requested shared memory be created. Additionally or alternatively, the size of shared memory 130 can be determined based on the information to be stored in the shared memory 130. For example, if a request to create shared memory into which a particular file is to be loaded is received, then the shared memory manager 116 can set the size of shared memory 130 to be the size of that file in memory.

A partition 120 and/or the host operating system 120 can load files into shared memory or non-shared memory (also referred to as private memory). In some situations, such as data files that a program in a partition desires to keep private, the files are loaded into private memory. However in other situations, such as DLLs or other files including executable programs, the files are loaded into shared memory. When a file is to be loaded into memory, the memory manager 114 is informed of whether a file is to be loaded into shared memory or private memory, and loads the file into the appropriate shared memory or private memory.

The memory manager 114 can be informed of whether a file is to be loaded into shared memory or private memory in a variety of different manners. In one or more embodiments, the file as stored in the file system of the system 100 (e.g., on the storage device 106) includes an attribute (e.g., a flag) indicating whether the file is shareable or private. Alternatively, the memory manager 114 can be informed of whether a file is to be loaded into shared memory or private memory in other manners, such as from a program running in a partition, from another component of the host operating system 102, and so forth. Whether a file is to be loaded into shared memory or private memory can be indicated to the memory manager 114 by, for example, mini-filters in the host operating system 102, the file system of the host operating system 102, a cache manager of the host operating system 102, a section creator (creating sections or portions of memory into which files are loaded) of the host operating system 102, and so forth.

The memory manager 114 prohibits access to memory to partitions 120 (other than the partition 120 that the file is private to) in which a file that is indicated as private is loaded. Thus, for a private file loaded into memory, since the private file is not shared the memory charges discussed above taken for shared memory need not be taken for the memory into which the private file is loaded.

Furthermore, situations can arise in which a request is made to load a file into shared memory, but there is insufficient space in the shared memory for the file. Such a request fails, and the memory manager 114 does not load the requested file into shared memory. In one or more embodiments, the memory manager 114 notifies the program or partition requesting loading of the file into shared memory that there is insufficient space in the shared memory for the file, informing the program or partition that the file can instead be loaded into private memory. The memory manager 114 can subsequently load the file into private memory in response to a subsequent request from the program or partition to load the file into private memory. Additionally or alternatively, the memory manager 114 notifies the partition manager 112 that there is insufficient space in the shared memory for the file. The partition manager 112 can decide to create more shared memory by increasing the size of the shared memory 130 if possible, creating another sharing partition, and so forth.

In one or more embodiments, the memory manager 114 can also allow certain partitions to access private memory of another partition. Such situations can arise, for example, when access controls (e.g., an access control list) associated with the file indicate that a particular partition is allowed to access the file. For example, if File X has associated access controls indicating that both Partition A and Partition B can read File X, then if File X is loaded into private memory of Partition A, the memory manager 114 can allow Partition B to read from the private memory of Partition A into which File X is loaded.

This allowed reading is done via the memory manager 114 acting as an intermediary or broker between Partition A's private memory and Partition B. A program from Partition B can make a read request for a file in private memory of Partition A, and if the access controls associated with the file indicate that Partition B can read the file, the memory manager 114 reads the content of that Partition A private memory and returns the read content to Partition B. Partition B does not have direct access to the private memory of Partition A and the memory pages in the private memory of Partition A are not included in the working set of the processes of Partition B. However, the memory manager 114 allows the data to be read into Partition B's private memory from Partition A's private memory, thereby effectively allowing partition B to access data from a private file belonging to partition A. In other words, no sharing of pages occurs, but there's access to the data.

Additionally, in situations in which the system 100 includes multiple shared memories (e.g., multiple sharing partitions), the memory manager 114 can be informed of which shared memory to load a file into. The memory manager 114 can be informed of which shared memory (e.g., which of multiple sharing partitions) to load a file into in various manners, such as from a program in a partition requesting that the file be loaded into shared memory, from a component of the host operating system 102, and so forth. Additionally or alternatively, the memory manager 114 may have a default shared memory that all files are loaded into unless requested otherwise (e.g., by a program in a partition or by the host operating system 102). Additionally or alternatively, the memory manager 114 may be hard-coded to load all files into a particular shared memory.

In one or more embodiments, the memory manager 114 also monitors multiple partitions 120 to identify memory pages in multiple partitions that store the same data. The memory manager 114 can identify memory pages in multiple partitions that are owned by the same entity or can do so across all partitions regardless of owner. When two memory pages are identified in two different partitions 120 and are the same (e.g., identical content stored in each of the two memory pages), then the memory manager 114 can copy the content of the memory pages to a sharing partition, and free the memory pages in the partitions 120 (e.g., make them available to store other content). The memory manager 114 maintains, for each of those two memory pages in the partitions, a pointer or other identifier of the memory page in shared memory. This effectively allows the two partitions to leverage the sharing partition and each need not keep a copy of the shared memory page, thereby saving memory and increasing the density of partitions in the system 100. However, the memory manager 114 would need to acquire the appropriate locked memory charges discussed above to make the pages shared since the pages will now be in the process working sets of multiple partitions.

The shared memory manager 116 can also optionally perform various additional management functionality within system 100 with respect to the shared memory 130. For example, the amount of memory within the system 100 that can be included in a sharing partition or otherwise available for use as shared memory 130 can be adjusted by the shared memory manager 116. This amount of memory included in a sharing partition or otherwise available for use as shared memory 130 can change over time based on resource usage within the system 100, such as the amount of memory in a sharing partition that is included in process working sets of other partitions 120 (e.g., how much of shared memory in a sharing partition is actually being shared with other partitions 120).

Figure 3:
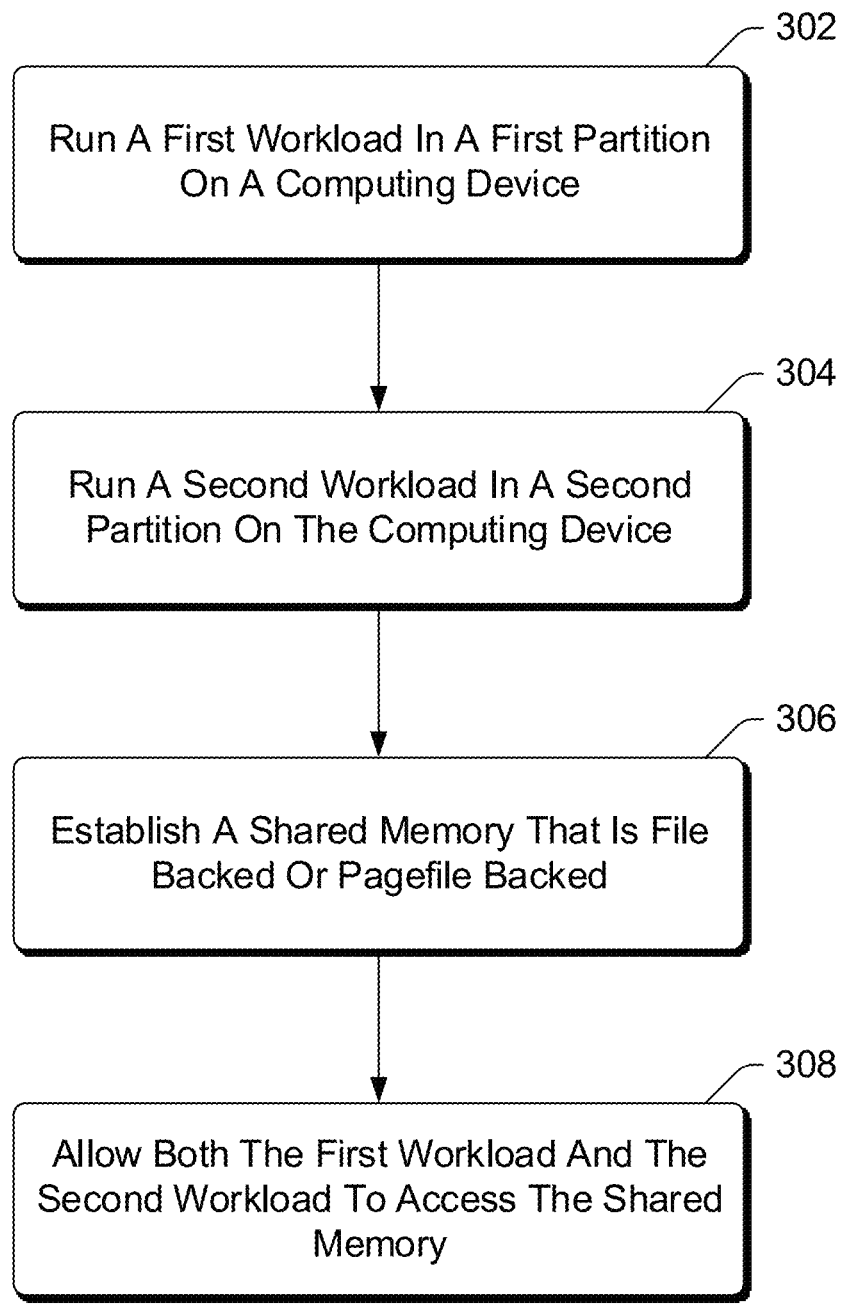
FIG. 3 is a flowchart illustrating an example process for implementing shared memory in memory isolated partitions in accordance with one or more embodiments.

FIG. 3 is a flowchart illustrating an example process 300 for implementing shared memory in memory isolated partitions in accordance with one or more embodiments. Process 300 is carried out by a system, such as system 100 of FIG. 1, and can be implemented in software, firmware, hardware, or combinations thereof. Process 300 is shown as a set of acts and is not limited to the order shown for performing the operations of the various acts. Process 300 is an example process for implementing shared memory in memory isolated partitions; additional discussions of implementing shared memory in memory isolated partitions are included herein with reference to different figures.

In process 300, a first workload is run in a first partition on a computing device (act 302). The first partition is a memory isolated partition as discussed above, and includes a first memory space. The first workload includes one or more programs that are run within the first partition.

A second workload is run in a second partition on the computing device (act 304). The second partition is a memory isolated partition as discussed above, and includes a second memory space that is a different memory space than the first memory space included in the first partition. The second workload includes one or more programs that are run within the second partition.

A shared memory is also established on the computing device (act 306). The shared memory is a file backed or pagefile backed memory. The shared memory can be a sharing partition (in addition to the first and second partitions in acts 302 and 304), a system partition, or a part of the first partition or second partition.

Both the first workload and the second workload are allowed to access the shared memory (act 308). This allows a file to be loaded into a single set of memory pages (in the shared memory) and accessed by multiple different partitions on the computing device. This reduces memory requirements for each of the first workload and the second workload, and increases the density of partitions on the computing device.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 4:
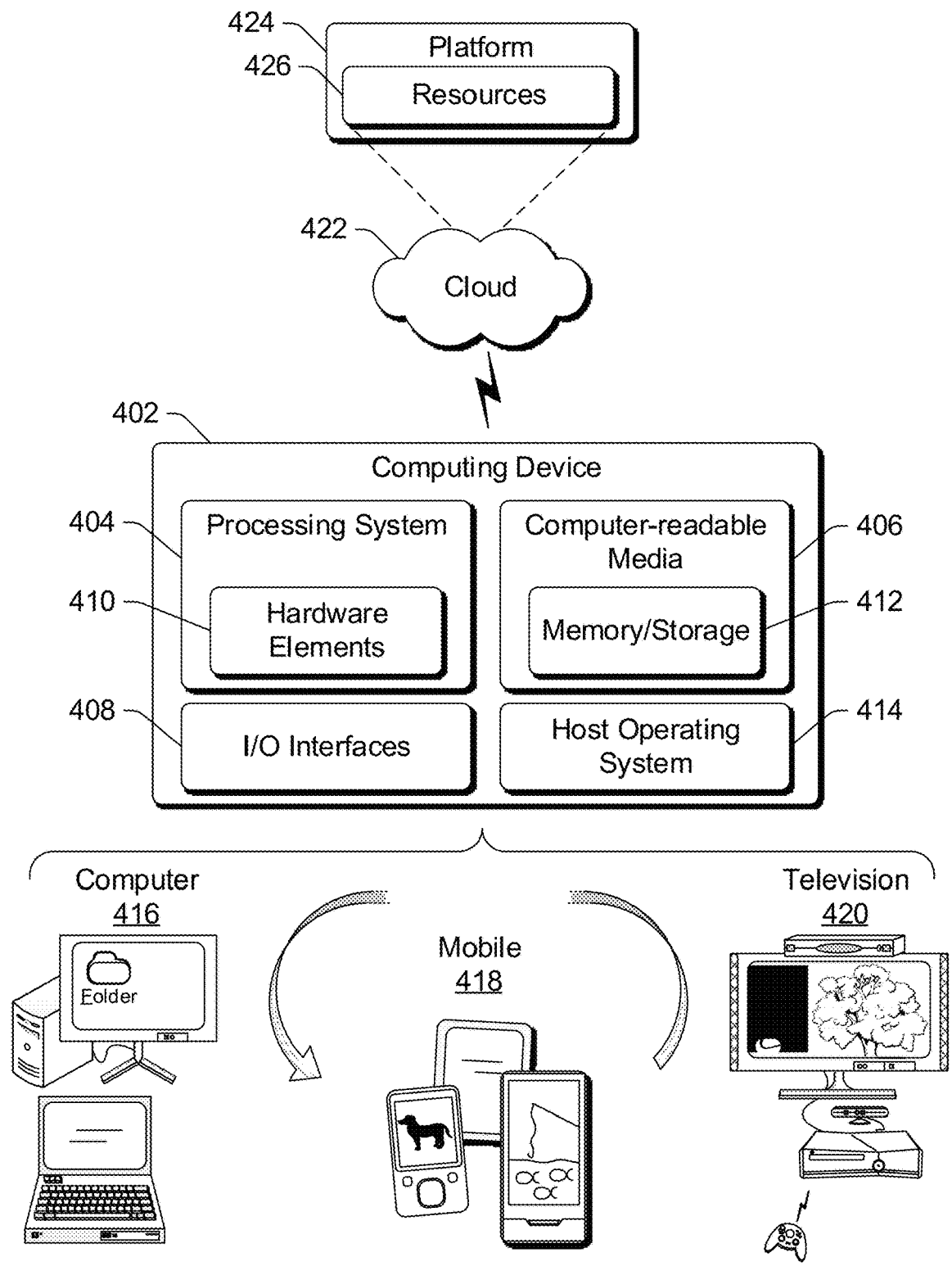
FIG. 4 illustrates an example system that includes an example computing device that is representative of one or more systems and/or devices that may implement the various techniques described herein.

FIG. 4 illustrates an example system generally at 400 that includes an example computing device 402 that is representative of one or more systems and/or devices that may implement the various techniques described herein. The computing device 402 may be, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O Interfaces 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 406 is illustrated as including memory/storage 412. The memory/storage 412 represents memory/storage capacity associated with one or more computer-readable media. The memory/storage 412 may include volatile media (such as random access memory (RAM)) and/or nonvolatile media (such as read only memory (ROM), Resistive RAM (ReRAM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

The one or more input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 402 may be configured in a variety of ways as further described below to support user interaction.

The computing device 402 also includes a host operating system 414. The host operating system 414 provides various management of shared memory for multiple partitions running in the computing device 402, as discussed above. The host operating system 414 can implement, for example, the host operating system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 410 and computer-readable media 406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of modules as a module that is executable by the computing device 402 as software may be achieved at least partially in hardware, e.g., through use of computer-readable storage media and/or hardware elements 410 of the processing system. The instructions and/or functions may be executable/operable by one or more articles of manufacture (for example, one or more computing devices 402 and/or processing systems 404) to implement techniques, modules, and examples described herein.

As further illustrated in FIG. 4, the example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 402 may assume a variety of different configurations, such as for computer 416, mobile 418, and television 420 uses. Each of these configurations includes devices that may have generally different constructs and capabilities, and thus the computing device 402 may be configured according to one or more of the different device classes. For instance, the computing device 402 may be implemented as the computer 416 class of a device that includes a personal computer, desktop computer, a multi-screen computer, laptop computer, netbook, and so on.

The computing device 402 may also be implemented as the mobile 418 class of device that includes mobile devices, such as a mobile phone, portable music player, portable gaming device, a tablet computer, a multi-screen computer, and so on. The computing device 402 may also be implemented as the television 420 class of device that includes devices having or connected to generally larger screens in casual viewing environments. These devices include televisions, set-top boxes, gaming consoles, and so on.

The techniques described herein may be supported by these various configurations of the computing device 402 and are not limited to the specific examples of the techniques described herein. This functionality may also be implemented all or in part through use of a distributed system, such as over a "cloud" 422 via a platform 424 as described below.

The cloud 422 includes and/or is representative of a platform 424 for resources 426. The platform 424 abstracts underlying functionality of hardware (e.g., servers) and software resources of the cloud 422. The resources 426 may include applications and/or data that can be utilized while computer processing is executed on servers that are remote from the computing device 402. Resources 426 can also include services provided over the Internet and/or through a subscriber network, such as a cellular or Wi-Fi network.

The platform 424 may abstract resources and functions to connect the computing device 402 with other computing devices. The platform 424 may also serve to abstract scaling of resources to provide a corresponding level of scale to encountered demand for the resources 426 that are implemented via the platform 424. Accordingly, in an interconnected device embodiment, implementation of functionality described herein may be distributed throughout the system 400. For example, the functionality may be implemented in part on the computing device 402 as well as via the platform 424 that abstracts the functionality of the cloud 422.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: running, on a computing device, a first workload in a first partition of multiple partitions on the computing device, the first partition including a first memory space; running, on the computing device, a second workload in a second partition of the multiple partitions on the computing device, the second partition including a second memory space; establishing a shared memory on the computing device, the shared memory comprising a file backed or pagefile backed memory; and allowing both the first workload and the second workload to access the shared memory.

Alternatively or in addition to any of the above described methods, any one or combination of: the method further comprising creating a third partition including a third memory space that is separate from the first memory space and the second memory space, the third memory space comprising the shared memory; the third partition being one of a the multiple partitions; the shared memory comprising a third memory space allocated to a host operating system of the computing device; the shared memory comprising a portion of the first memory space or the second memory space; the method further comprising taking memory charges for the shared memory as if the shared memory were locked in physical memory of the computing device; the method further comprising changing the amount of memory included in the shared memory over time; wherein at least a portion of the first memory space is a file backed or pagefile backed memory into which a private file that is not shared with the second partition is loaded, and at least a portion of the second memory space is a file backed or pagefile backed memory into which a private file that is not shared with the first partition is loaded and for which locked memory charges need not be taken; the method further comprising receiving a read request from a program in the first portion for a file that has been loaded into a portion of the second memory space, copying the content of the portion of the second memory space into which the file has been loaded, returning the copied content of the portion of the second memory space to the program; the method further comprising receiving a request to load a file, receiving an indication that the file is to be shared among multiple partitions, and loading, in response to the request and the indication, the file into the shared memory; the method further comprising monitoring memory pages in the first memory space and the second memory space, identifying a first memory page in the first memory space storing identical content as a second memory page in the second memory space, copying the content of the first memory page or the second memory page to a memory page in the shared memory, maintaining a first identifier, for the first memory page, pointing to the memory page in the shared memory, and maintaining a second identifier, for the second memory page, pointing to the memory page in the shared memory.

A computing device comprising: a storage device maintaining a file or pagefile; a partition manager configured to run a first workload in a first partition of multiple partitions on the computing device, the first partition including a first memory space, and to run a second workload in a second partition of the multiple partitions on the computing device, the second partition including a second memory space; and a shared memory manager configured to establish a shared memory on the computing device, the shared memory comprising memory backed by the file or pagefile, and to allow both the first workload and the second workload to access the shared memory.

Alternatively or in addition to any of the above described computing devices, any one or combination of: the partition manager being further configured to create a third partition including a third memory space that is separate from the first memory space and the second memory space, the third memory space comprising the shared memory; the shared memory manager being further configured to take memory charges for the shared memory as if the shared memory were locked in physical memory of the computing device; the shared memory manager being further configured to receive a request to load a file, receive an indication that the file is to be shared among multiple partitions, and load, in response to the request and the indication, the file into the shared memory.

A computing device comprising: a storage device maintaining a file or pagefile; one or more processors; and a computer-readable storage medium having stored thereon multiple instructions that, responsive to execution by the one or more processors, cause the one or more processors to: run, on the computing device, a workload in each of multiple partitions on the computing device; establish a shared memory on the computing device, the shared memory comprising a memory backed by the file and/or pagefile; and allow the workloads in each of the multiple partitions to access the shared memory.

Alternatively or in addition to any of the above described computing devices, any one or combination of: the multiple instructions further causing the one or more processors to create a third partition including a third memory space that is separate from the first memory space and the second memory space, the third memory space comprising the shared memory; the multiple instructions further causing the one or more processors to take memory charges for the shared memory as if the shared memory were locked in physical memory of the computing device; the multiple instructions further causing the one or more processors to receive a request to load a file; receive an indication that the file is to be shared among multiple partitions; and load, in response to the request and the indication, the file into the shared memory; the multiple instructions further causing the one or more processors to monitor memory pages in the first memory space and the second memory space, identify a first memory page in the first memory space storing identical content as a second memory page in the second memory space, copy the content of the first memory page or the second memory page to a memory page in the shared memory, maintain a first identifier, for the first memory page, pointing to the memory page in the shared memory, and maintain a second identifier, for the second memory page, pointing to the memory page in the shared memory.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing device comprising storage hardware and processing hardware, the method comprising:
   maintaining a file or pagefile on the storage hardware;
   execute a partition manager and a shared memory manager;
   running, by the partition manager, a first workload in a first partition of multiple partitions on the computing device, the first partition including a first memory space;
   running, by the partition manager, a second workload in a second partition of the multiple partitions on the computing device, the second partition including a second memory space; and
   establishing, by the shared memory manager, a shared memory on the computing device, the shared memory comprising memory backed by the file or pagefile, and allowing both the first workload and the second workload to access the shared memory, wherein the first partition uses pages of the first memory space and pages of the shared memory to back file mappings of files in the first partition that are used by the first workload, and wherein the second partition uses pages of the second memory space and pages of the shared memory to back file mappings of files in the second partition that are used by the second workload.

2. A method according to claim 1, further comprising enabling the first partition to control which other partitions have access to the shared memory.

3. A method according to claim 2, wherein access control information is stored in the first partition and is enforced by the shared memory manager.

4. A method according to claim 1, wherein the shared memory is established without explicit instruction from any of the partitions.

5. A method according to claim 1, wherein the shared memory is sized according to the size of a file loaded into the shared memory.

6. A method according to claim 1, further comprising:
   monitoring memory corresponding to the multiple partitions to identify pages of memory storing same content; and
   consolidating the identified pages into the shared memory.

7. Computer-readable storage hardware storing instructions that, when executed by a computing device cause the computing device to perform a process, the process comprising:
   running, on the computing device, a first workload in a first partition of multiple partitions on the computing device, the first partition including a first memory space;
   running, on the computing device, a second workload in a second partition of the multiple partitions on the computing device, the second partition including a second memory space;
   establishing a shared memory on the computing device, the shared memory comprising a file-backed or pagefile-backed memory;
   allowing the first workload and the second workload to access the shared memory;
   monitoring memory pages in the first memory space and in the second memory space;
   identifying a first memory page in the first memory space storing identical content as a second memory page in the second memory space;

copying the content of the first memory page or the second memory page to a memory page in the shared memory;

maintaining a first identifier, for the first memory page, pointing to the memory page in the shared memory; and maintaining a second identifier, for the second memory page, pointing to the memory page in the shared memory.

8. Computer-readable storage hardware according to claim 1, wherein the shared memory comprises memory of a third partition.

9. Computer-readable storage hardware according to claim 1, the process further comprising monitoring use of the shared memory to maintain sharing information indicating which shared memory pages of the shared memory are being used by which of the partitions.

10. Computer-readable storage hardware according to claim 9, the process further comprising preventing a one of the multiple partitions from exiting until all partitions that are attached to the shared memory have exited or otherwise indicated they do not need the shared memory pages.

11. Computer-readable storage hardware according to claim 9, the process further comprising preventing a page of the shared memory from being unloaded until all partitions that are attached to the shared memory have exited or otherwise indicated they do not need the shared memory pages.

12. Computer-readable storage hardware according to claim 11, wherein the preventing is based on the sharing information.

13. Computer-readable storage hardware according to claim 1, the process further comprising preventing pages of the shared memory from being swapped out.

14. Computer-readable storage hardware according to claim 1, wherein the first memory space comprises a first memory address space managed in the first partition, the second memory space comprises a second memory address space managed in the second partition, and the shared memory comprises a memory page in a third memory address spaced managed by a virtualization layer that manages the multiple partitions.

15. Computer-readable storage hardware according to claim 14, wherein the virtualization layer maps the first and second memory address spaces to the third memory address space.

16. Computer-readable storage hardware storing instructions that when executed by a computing device cause the computing device to perform a process, the process comprising:

maintaining a file or pagefile on the storage hardware;

executing a partition manager and a shared memory manager;

running, by the partition manager, a first workload in a first partition of multiple partitions on the computing device, the first partition including a private first memory space and a first file, wherein the first file is backed by a portion of the private first memory;

running, by the partition manager, a second workload in a second partition of the multiple partitions on the computing device, the second partition including a program, a second private memory space, and a second file, wherein the program, running in the second partition, requests a read of the second file; and responding, by the shared memory manager, to the read request by: determining to satisfy the read request by using the portion of the first private memory that is backing the first file to back the second file in the second partition, wherein in response to the request to read the second file the program receives content from the portion of the private first memory.

17. Computer-readable storage hardware according to claim 16, the process further comprising generating and storing mapping information mapping between addresses of pages of the portion of private first memory and addresses of pages in the second partition.

18. Computer-readable storage hardware according to claim 16, the process further comprising determining that the portion of the private first memory is not mapped to any pages in any partitions, and based thereon releasing the portion of the private first memory.

19. Computer-readable storage hardware according to claim 16, wherein a virtualization layer manages the multiple partitions, and wherein the multiple partitions comprise respective process containers.

20. Computer-readable storage hardware according to claim 16, the process further comprising monitoring and tracking which memory pages of the portion of private first memory are used by which partitions.

* * * * *